(12) United States Patent
Lee et al.

(10) Patent No.: US 7,121,724 B2
(45) Date of Patent: Oct. 17, 2006

(54) LINEAR MOTION GUIDE DEVICE

(76) Inventors: Mao Tu Lee, No. 10, Fu Hsing Street, Gong Yeh Chu, Tu Chern City, Taipei Hsien (TW) 236; Chin Hsiang Wang, No. 10, Fu Hsing Street, Gong Yeh Chu, Tu Chern City, Taipei Hsien (TW) 236

( * ) Notice: Subject to any disclaimer, the term of this patent is extended or adjusted under 35 U.S.C. 154(b) by 145 days.

(21) Appl. No.: 10/923,113

(22) Filed: Aug. 19, 2004

(65) Prior Publication Data
US 2005/0018934 A1 Jan. 27, 2005

Related U.S. Application Data

(63) Continuation-in-part of application No. 10/355,908, filed on Jan. 29, 2003, now abandoned.

(51) Int. Cl.
*F16C 29/06* (2006.01)
(52) U.S. Cl. ........................................................ 384/45
(58) Field of Classification Search ............ 384/43–45
See application file for complete search history.

(56) References Cited

U.S. PATENT DOCUMENTS

| | | | |
|---|---|---|---|
| 6,109,789 A | 8/2000 | Chen | 384/48 |
| 6,200,031 B1 | 3/2001 | Faulhaber et al. | 384/45 |
| 6,305,846 B1 | 10/2001 | Michioka et al. | 384/45 |
| 6,390,678 B1 | 5/2002 | Shirai | 384/44 |
| 6,520,681 B1 * | 2/2003 | Ishihara | 384/45 |
| 6,652,146 B1 | 11/2003 | Lee | 384/45 |
| 2002/0021847 A1 * | 2/2002 | Wu | 384/45 |

* cited by examiner

*Primary Examiner*—Thomas R. Hannon
(74) *Attorney, Agent, or Firm*—Charles E. Baxley (57) ABSTRACT

A linear motion guide device includes a casing having two beams disposed between two end plates and two side panels of a frame, each beam has a longitudinal slot, two stops are secured to the end plates with latches, and each has a projection engaged with the casing, to anchor the casing in the frame, and each has two indentations communicating with the longitudinal passages of the side panels and the longitudinal slots of the beams of the casing, to form two endless roller-circulation paths, and to receive rotary members. Two pressing members include two ends secured to the stops, and engaged with the rotary members, to retain the stops and the frame together.

6 Claims, 8 Drawing Sheets

LINEAR MOTION GUIDE DEVICE

The present invention is a continuation-in-part of U.S. patent application Ser. No. 10/355,908, filed 29 Jan. 2003, to be abandoned.

BACKGROUND OF THE INVENTION

1. Field of the Invention

The present invention relates to a linear motion guide device, and more particularly to a linear motion guide device having improved ball or roller guiding mechanisms for facilitating the sliding movements between objects.

2. Description of the Prior Art

Typical bearings are provided and engaged between two rotary members, for facilitating the rotational movements between the two rotary or sliding members.

However, when two objects are slidably engaged or coupled with each other, no suitable linear motion guide devices have been provided for facilitating the sliding movements between the two slidable objects.

U.S. Pat. No. 6,305,846 to Michioka et al., U.S. Pat. No. 6,390,678 to Shirai, and U.S. Pat. No. 6,652,146 to Lee disclose three of the typical linear motion guide devices each comprising two endless and sliding type roller connectors slidably received in two endless roller-circulation paths.

However, each of the endless and sliding type roller connectors includes a number of balls or rollers that are required to be coupled or connected together with a complicated connection portion such that the typical linear motion guide devices each comprising a complicated configuration that may not be easily assembled, and that may cost much for manufacturing purposes.

U.S. Pat. No. 6,109,789 to Chen, U.S. Pat. No. 6,200,031 to Faulhaber et al., U.S. patent application Publication No. US2002/0021847 to Wu, and U.S. patent application Publication No. US2002/0141667 to Ishihara disclose the other typical linear motion guide devices each also comprising two endless and sliding type roller connectors slidably received in two endless roller-circulation paths.

However, for stably and smoothly retaining the balls or rollers within the endless roller-circulation paths, a number of parts or elements are required to be manufactured and assembled, to allow the balls or rollers to be easily assembled into and retained within the endless roller-circulation paths, and to prevent the balls or rollers from being disengaged from the endless roller-circulation paths, such that the typical linear motion guide devices also comprising a complicated configuration that may not be easily assembled, and that may cost much for manufacturing purposes.

For example, U.S. patent application Publication No. US2002/0021847 to Wu includes two end caps that are required to be secured together with male protuberances and female recesses, and two oil scrapers are required to be secured to the end caps with a number of tenons and positioning flanges. In addition, the sliding block may not be solidly attached to the guide plates.

In U.S. Pat. No. 6,200,031 to Faulhaber et al., two reversing plates are anchored to a carriage member by projections that may not solidly secure the reversing plates and the carriage member together, such that the reversing plates may have good chances to be separated from the carriage member, and such that vibrations may be generated between the reversing plates and the carriage member.

The present invention has arisen to mitigate and/or obviate the afore-described disadvantages of the conventional linear motion guide devices.

SUMMARY OF THE INVENTION

The primary objective of the present invention is to provide a linear motion guide device having an improved ball or roller guiding mechanism for facilitating the sliding movements between sliding objects and for allowing the linear motion guide device to be easily and quickly assembled.

In accordance with one aspect of the invention, there is provided a linear motion guide device comprising a frame including two side panels each having a longitudinal passage formed therein, including two end plates each having an opening formed therein and each having two notches formed therein and communicating with the opening of the end plate, each of the end plates of the frame including at least one latch extended therefrom, a casing including two beams extended therefrom and received in the frame and disposed between the end plates and the side panels of the frame, each of the beams of the casing including a longitudinal slot formed therein, the casing including two ends each having a recess formed therein, two stops engaged onto the end plates of the frame respectively, and each including a passageway formed therein to receive the latch of the end plates of the frame, to secure the stops onto the end plates of the frame respectively, each of the stops including a projection extended therefrom and engaged with the end recesses of the casing, to anchor the casing in the frame, and to stably retain the casing and the stops and the frame together, each of the stops including two indentations formed therein and communicating with the longitudinal passages of the side panels and the longitudinal slots of the beams of the casing, to form two endless roller-circulation paths, each of the stops including an opening formed therein, a number of rotary members slidably received in the endless roller-circulation paths formed by the longitudinal passages of the side panels and the longitudinal slots of the beams and the indentations of the stops, two pressing members engaged with the rotary members and each including two ends engaged with the stops respectively, to retain the stops and the frame together, and to stably retain the rotary members in the longitudinal slots of the beams, and an elongate track slidably engaged through the openings of the stops, and the openings of the end plates of the frame, and the elongate track including two side longitudinal depressions formed therein, to receive the rotary members, and to allow the frame and the stops and the casing to slide relative to the elongate track with the rotary members.

The indentations of the stops include a semi-circular structure. Each of the stops includes two depressions formed therein, and communicating with the indentations thereof, and the frame includes two flaps extended from each side thereof and engaged into the depressions of the stops, to anchor the frame and the stops together.

The casing includes two side flanges engaged onto the side panels of the frame respectively. Two covers may further be provided and secured onto the stops respectively, to enclose the stops respectively.

Each of the covers includes at least one catch extended therefrom, and engaged into the lock passageways of the stops respectively, to secure the covers onto the stops, each of the covers includes an opening formed therein to slidably receive the elongate track.

The notches of the end plates of the frame are aligned with and communicating with the longitudinal slots of the beams, to form as a portion of the endless roller-circulation paths.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
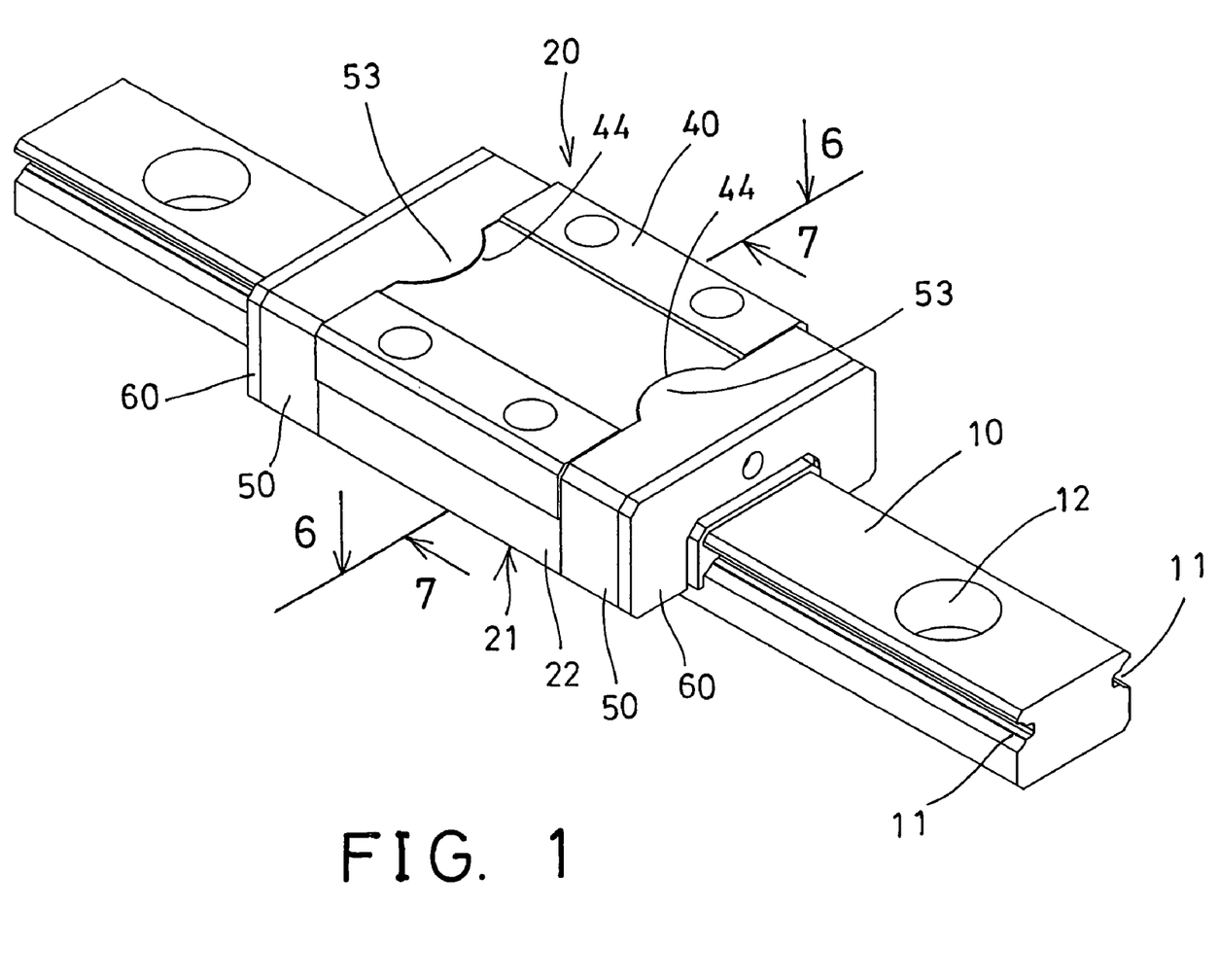
FIG. 1 is a perspective view illustrating a linear motion guide device in accordance with the present invention.

Referring to the drawings, and initially to FIG. 1, a linear motion guide device in accordance with the present invention is provided for being disposed in various kinds of apparatus, such as computers, machines, etc., for facilitating sliding movements between two or more relative slidable objects.

Figure 2:
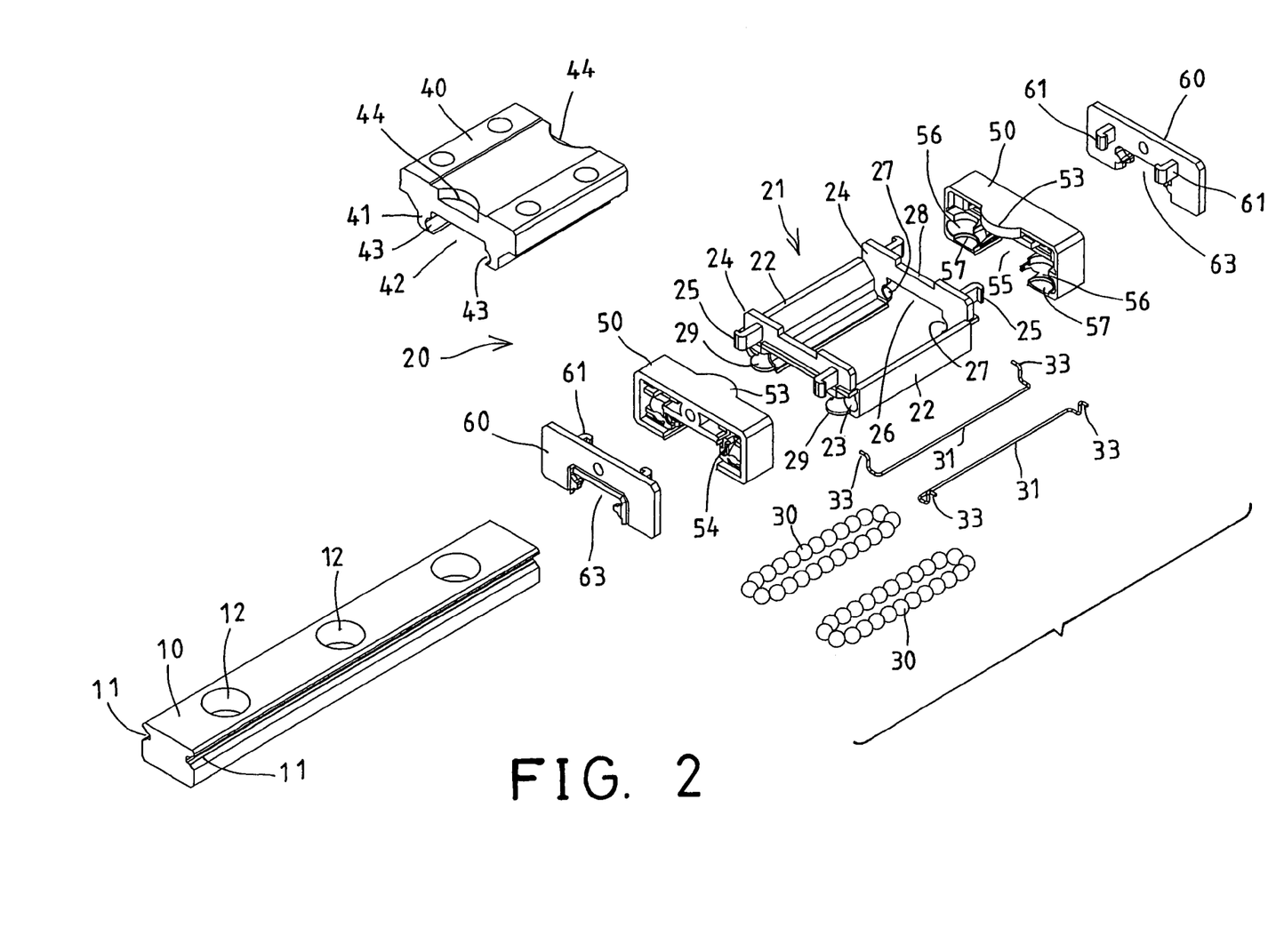
FIG. 2 is an exploded view of the linear motion guide device.
Figure 3:
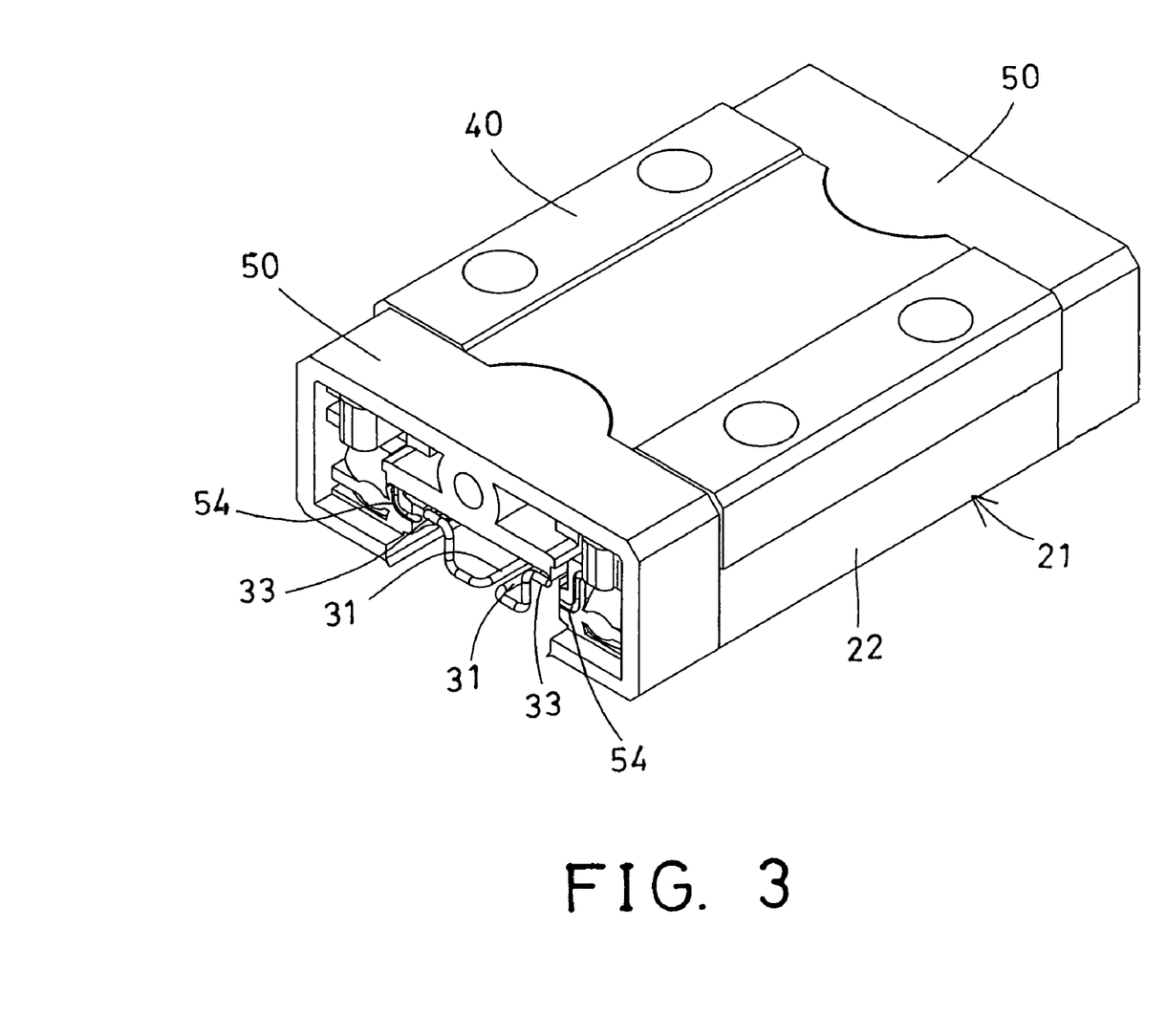
FIG. 3 is a perspective view of the linear motion guide device similar to FIG. 1, in which an elongate track has been removed.

For example, as shown in FIGS. 2 and 3, the linear motion guide device comprises an elongate member 10, such as an elongate track 10 including one or two sides each having a longitudinal depression 11 formed therein for slidably receiving rotary members 30, such as balls, rollers, etc. therein. The elongate track 10 may include one or more holes 12 formed therein for securing to the apparatus or objects with such as fasteners.

A sliding member 20 is to be slidably engaged onto and movable along the elongate track 10, and includes a frame 21 having a pair of side panels 22 and two end plates 24 secured between the ends of the side panels 22 respectively, in order to form a substantially parallelogrammic structure. The side panels 22 each may include a longitudinal passage 23 formed therethrough for slidably receiving the rotary members 30 therein (FIGS. 6, 7).

The end plates 24 each may include an opening 26 formed therein, such as formed in the lower portion thereof, to slidably receive the elongate track 10 therein. The end plates 24 each may include two notches 27 formed therein and communicating with the opening 26 thereof, and each may include an indentation 28 formed in the upper portion thereof, and each may include one or more hooks or fasteners or latches 25 extended therefrom. The frame 21 includes two flaps 29 extended from each of two ends thereof.

A casing 40 is engaged into the frame 21, and disposed between the end plates 24 of the frame 21, such that the casing 40 may be-retained in the frame 21 and may be moved in concert with the frame 21 relative to the elongate track 10. The casing 40 includes one or more, such as two beams 41 extended downwardly therefrom and disposed between the side panels 22 of the frame 21. The casing 40 includes a channel 42 formed or defined between the beams 41 to partially receiving the longitudinal track 10, such as to partially receiving the upper portion of the longitudinal track 10.

Figure 6:
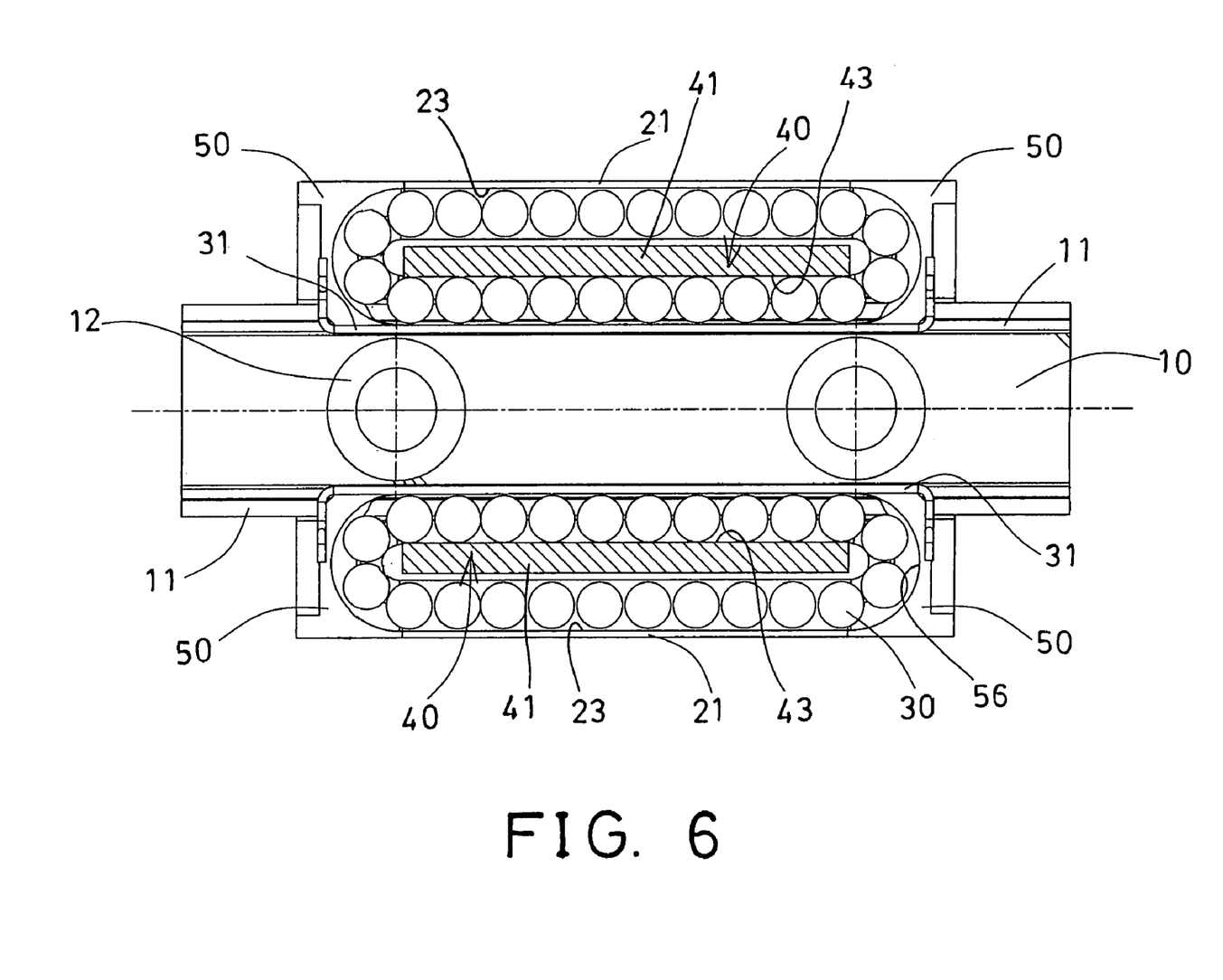
FIGS. 6, 7 are cross sectional views taken along lines 6—6 and 7—7 of FIG. 1 respectively.
Figure 7:
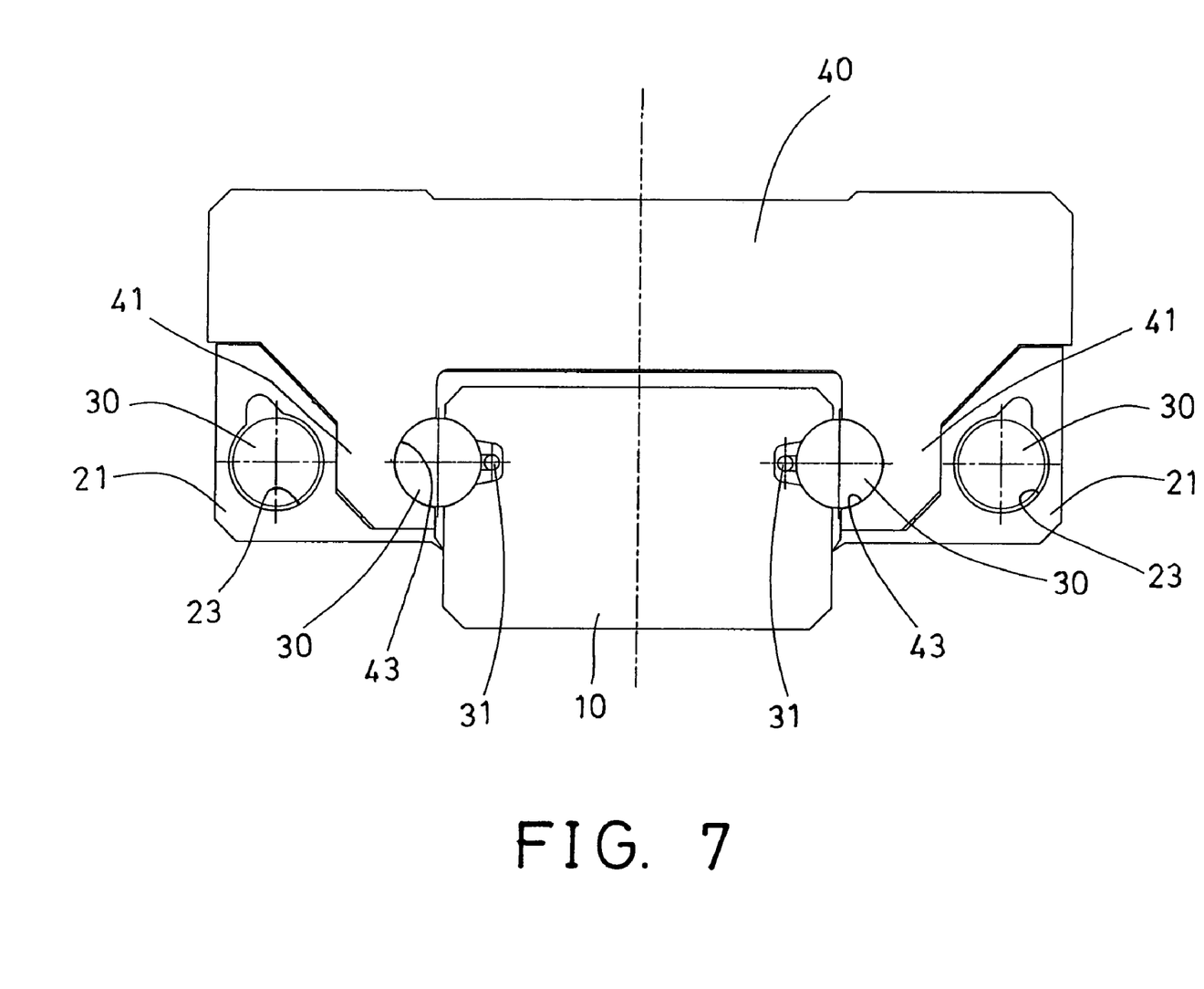

The beams 41 each may include a longitudinal slot 43 formed therein and communicating with the channel 42 thereof, and aligned with and communicating with the notches 27 of the end plates 24, to slidably receive the rotary members 30 therein (FIGS. 6, 7). The rotary members 30 may thus be received in the longitudinal slots 43 of the beams 41 and the longitudinal depressions 11 of the elongate track 10 respectively, and may be stably retained between the beams 41 and the elongate track 10, to facilitate the sliding movement between the sliding member 20 and the elongate track 10.

For example, the rotary members 30, such as the balls or rollers of the linear motion guide device may form or provide contact points between the elongate track 10 and the beams 41 of the casing 40, and may thus reduce the contact areas between the elongate track 10 and the beams 41 of the casing 40, such that the sliding movement between the sliding member 20 relative to the elongate track 10 may be facilitated or improved. The casing 40 includes two end portions each having a recess 44 formed therein, and includes two side flanges to be engaged onto or straddled or supported on the side panels 22 of the frame 21.

Figure 4:
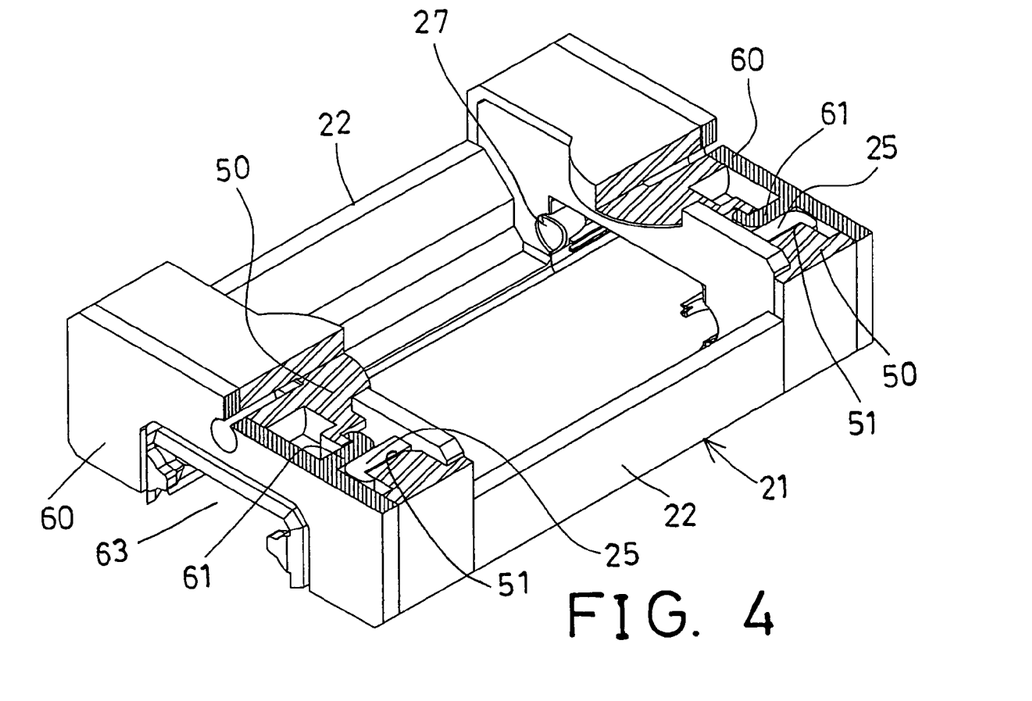
FIG. 4 is a perspective view similar to FIG. 3, in which a portion of the guide device has been cut off to show an inner structure thereof.

Two stops 50 are to be engaged onto or secured to the ends of the frame 21. For example, the stops 50 each may include one or more, such as two lock passageways 51 formed therein to receive the latches 25 of the frame 21 respectively (FIG. 4), which may easily and readily secure the stops 50 to the frame 21 without additional fasteners or tools.

The stops 50 each may include a projection 53 extended therefrom, and engaged into the respective indentations 28 of the frame 21 and the recesses 44 of the casing 40, so as to secure or to lock and to retain the casing 40 in the frame 21, and to prevent the casing 40 from being disengaged from the frame 21. The frame 21 and the casing 40 and the stops 50 may thus be secured together and may be moved in concert with each other, relative to or along the elongate track 10.

The stops 50 each may include one or more, such as two cavities 54 formed therein, such as formed in the outer portion thereof. The stops 50 each may also include an opening 55 formed therein, such as formed in the lower portion thereof, to slidably receive the elongate track 10 therein. The stops 50 each may further include one or more, such as two semi-circular indentations 56 formed therein, such as formed in the inner portion thereof (FIGS. 2, 6, 7, 9).

As best shown in FIG. 6, the semi-circular indentations 56 of the stops 50 are communicating with the longitudinal passages 23 of the side panels 22 and the longitudinal slots 43 of the beams 41 of the casing 40, to form two endless roller-circulation paths and to slidably receive the rotary members 30, and thus to allow the rotary members 30 to smoothly slide through the longitudinal passages 23 of the side panels 22 and the longitudinal slots 43 of the beams 41 of the casing 40.

Each of the stops 50 may further include one or more, such as two semi-circular depressions 57 formed therein, such as formed in the inner portion thereof, and communicating with the indentations 56 of the stops 50, to receive the flaps 29 of the frame 21, to further stably anchor or secure the frame 21 and the stops 50 together, and to allow the rotary members 30 to further smoothly slide through the endless roller-circulation paths formed by the longitudinal passages 23 of the side panels 22 and the longitudinal slots 43 of the beams 41 of the casing 40 and the semi-circular indentations 56 of the stops 50.

Figure 10:
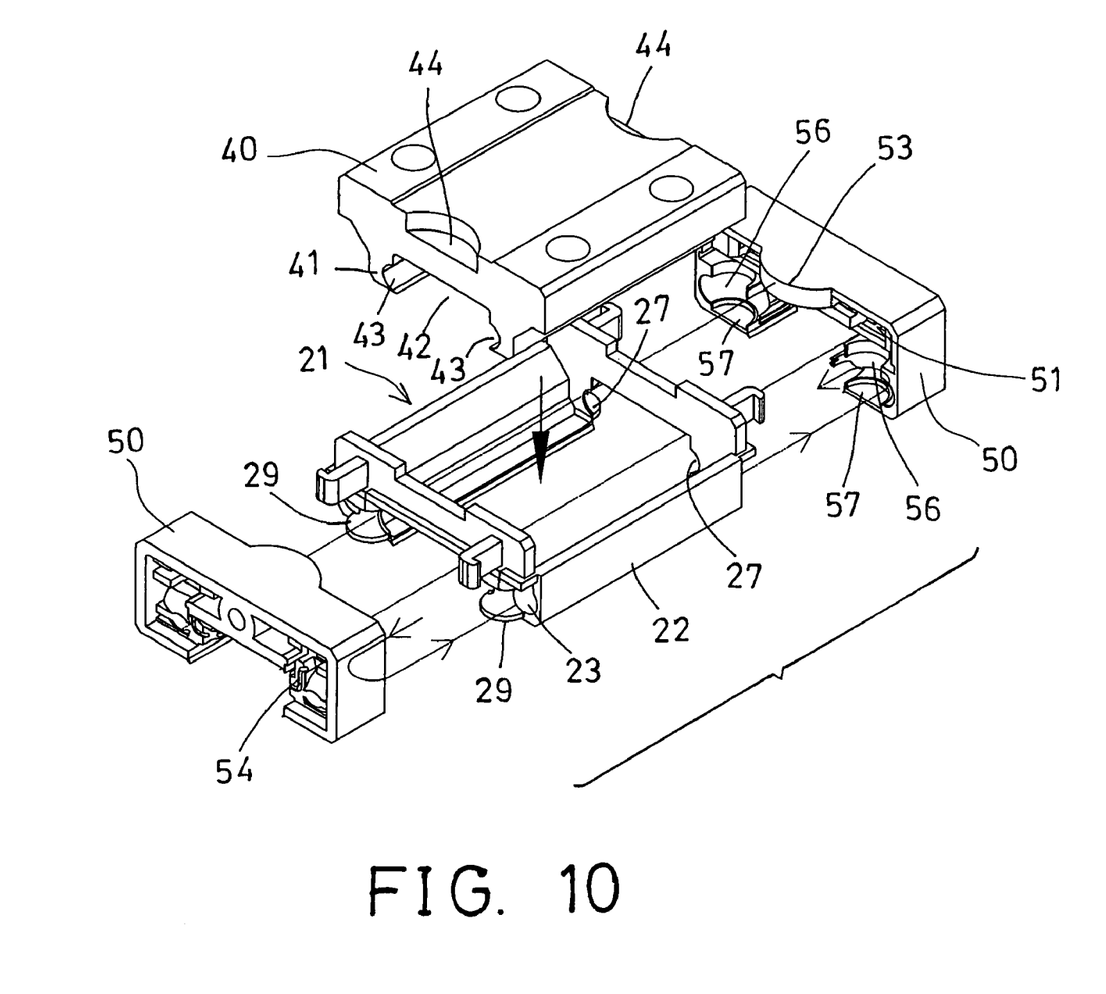
FIG. 10 is a partial exploded view illustrating the endless roller-circulation paths of the linear motion guide device.

As shown in FIG. 10, the notches 27 of the end plates 24 are located between the longitudinal slots 43 of the beams 41 of the casing 40 and the semi-circular indentations 56 of the stops 50, such that the rotary members 30 will also slide or move through the notches 27 of the end plates 24, and such that the notches 27 of the end plates 24 will also be formed as a portion of the endless roller-circulation paths for slidably receiving the rotary members 30.

Figure 5:
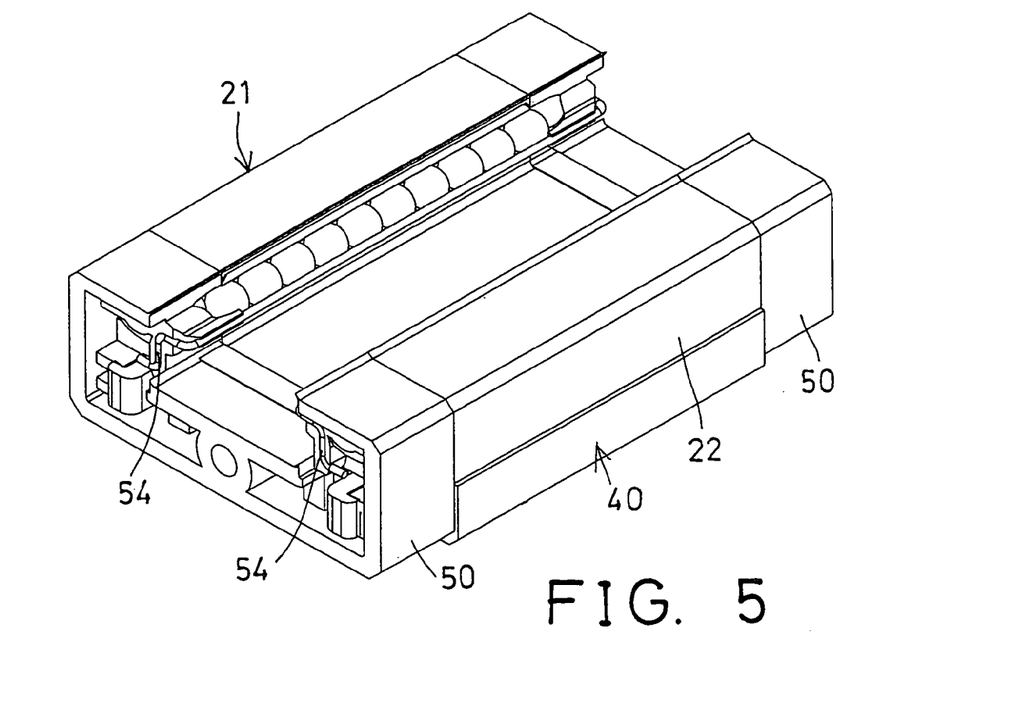
FIG. 5 is a bottom perspective view of the linear motion guide device.
Figure 8:
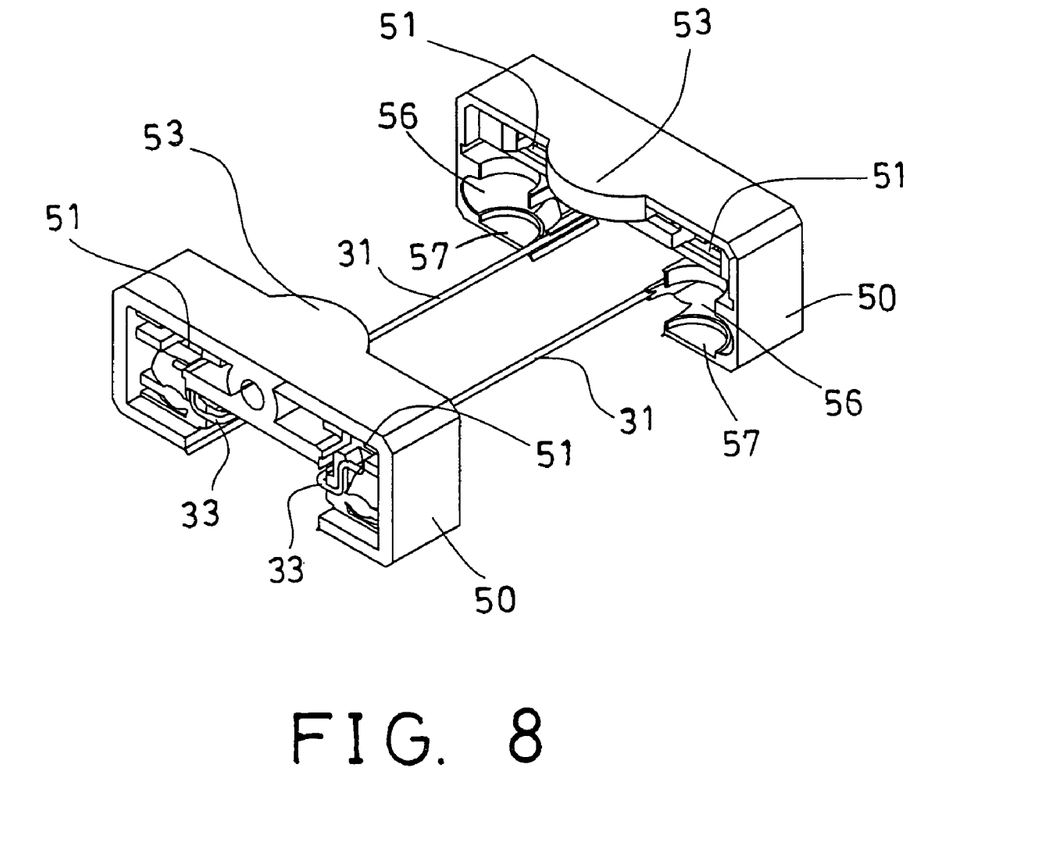
FIG. 8 is a partial perspective view illustrating an assembling operation of the linear motion guide device.
Figure 9:
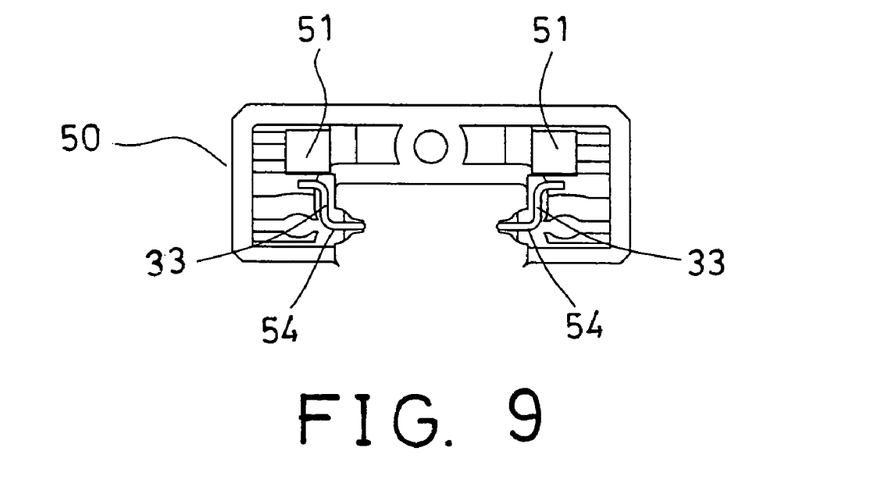
FIG. 9 is an end view of the linear motion guide device as shown in FIG. 8.

One or more, such as two pressing members 31 may further be provided to engage with the rotary members 30, and to stably retain the rotary members 30 to the beams 41 (FIGS. 5–7), and thus to further facilitate the stably sliding movement between the sliding member 20 and the elongate track 10. For example, the pressing members 31 may include a longitudinal structure to engage with the rotary members 30, and each may include two bent ends 33 engaged into the cavities 54 of the stops 50 (FIGS. 3, 5, 8–10), such that the pressing members 31 may also be used to retain the stops 50 and the frame 21 together (FIG. 8).

Two covers 60 may further be provided and may include one or more, such as two hooks or fasteners or catches 61 extended therefrom, and engageable into the lock passageways 51 of the stops 50 respectively (FIG. 4), for securing the covers 60 onto the stops 50, and in order to shielding or blocking the ends of the stops 50, and so as to form a smooth or complete outer appearance for the sliding member 20.

The covers 60 each may also include an opening 63 formed therein, such as formed in the lower portion thereof, to slidably receive the elongate track 10 therein. Alternatively, the covers 60 may also be directly formed integral with the stops 50 respectively, without additional securing or fastener members.

In assembling the linear motion guide device, the beams 41 of the casing 40 may then be engaged into the frame 21, and the stops 50 may then be secured onto the ends of the frame 21, and to engage the projection 53 into the respective indentations 28 of the frame 21 and the recesses 44 of the casing 40, so as to secure or to lock and to retain the casing 40 in the frame 21.

The rotary members 30 may then be engaged into the longitudinal passages 23 of the side panels 22 via the semi-circular indentations 56 of the stops 50, and may also be engaged into the longitudinal slots 43 of the beams 41, the pressing members 31 may then be engaged with the rotary members 30, to stably retain the rotary members 30 in the longitudinal slots 43 of the beams 41, and thus to allow the frame 21 and the casing 40 and the stops 50 and the rotary members 30 to be stably secured together to form the sliding member 20.

The covers 60 may then be optionally or selectively engaged or secured onto the ends of the stops 50, in order to form a smooth or complete outer appearance for the sliding member 20. The sliding member 20 may thus be easily and quickly assembled without additional fasteners and tools. The sliding member 20 may then be easily and readily engaged onto the elongate track 10 by engaging the elongate track 10 into the openings 63 of the covers 60 and the openings 55 of the stops 50 and the openings 26 of the end plates 24.

In operation, the elongate track 10 may be provided or secured in various kinds of apparatus, such as computers, machines, etc., and the other objects may be secured onto the frame 21 or the casing 40 of the sliding member 20, for allowing the objects to be smoothly and stably supported and slid along the elongate track 10.

Accordingly, the linear motion guide device in accordance with the present invention includes an improved ball or roller guiding mechanism for facilitating the sliding movements between sliding member and the elongate track and for allowing the linear motion guide device to be easily and quickly assembled.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A linear motion guide device comprising:
   a frame including two side panels each having a longitudinal passage formed therein, including two end plates each having an opening formed therein and each having two notches formed therein and communicating with said opening of said end plate, each of said end plates of said frame including at least one latch extended therefrom,
   a casing including two beams extended therefrom and received in said frame and disposed between said end plates and said side panels of said frame, each of said beams of said casing including a longitudinal slot formed therein, said casing including two ends each having a recess formed therein,
   two stops engaged onto said end plates of said frame respectively, and each including a passageway formed therein to receive said at least one latch of said end plates of said frame, to secure said stops onto said end plates of said frame respectively, each of said stops including a projection extended therefrom and engaged with said end recesses of said casing, to anchor said casing in said frame, and to stably retain said casing and said stops and said frame together, each of said stops including two indentations formed therein and communicating with said longitudinal passages of said side panels and said longitudinal slots of said beams of said casing, to form two endless roller-circulation paths, each of said stops including an opening formed therein,
   a plurality of rotary members slidably received in said endless roller-circulation paths formed by said longitudinal passages of said side panels and said longitudinal slots of said beams and said indentations of said stops,
   two pressing members engaged with said rotary members and each including two ends engaged with said stops respectively, to retain said stops and said frame together, and to stably retain said rotary members in said longitudinal slots of said beams, and
   an elongate track slidably engaged through said openings of said stops, and said openings of said end plates of said frame, and said elongate track including two side longitudinal depressions formed therein, to receive said rotary members, and to allow said frame and said stops and said casing to slide relative to said elongate track with said rotary members.

2. The linear motion guide device as claimed in claim 1, wherein said indentations of said stops include a semi-circular structure.

3. The linear motion guide device as claimed in claim 1, wherein each of said stops includes two depressions formed therein, and communicating with said indentations thereof, and said frame includes two flaps extended from each side thereof and engaged into said depressions of said stops, to anchor said frame and said stops together.

4. The linear motion guide device as claimed in claim 1 further comprising two covers secured onto said stops respectively, to enclose said stops respectively.

5. The linear motion guide device as claimed in claim 4, wherein each of said covers includes at least one catch extended therefrom, and engaged into said passageways of said stops respectively, to secure said covers onto said stops, each of said covers includes an opening formed therein to slidably receive said elongate track.

6. The linear motion guide device as claimed in claim 1, wherein said notches of said end plates of said frame are aligned with and communicating with said longitudinal slots of said beams, to form as a portion of said endless roller-circulation paths.

* * * * *